Dec. 12, 1933.  E. L. HALL  1,939,393
PROCESS OF THE MANUFACTURE OF CARBURETED WATER GAS
Filed March 5, 1931  2 Sheets-Sheet 1
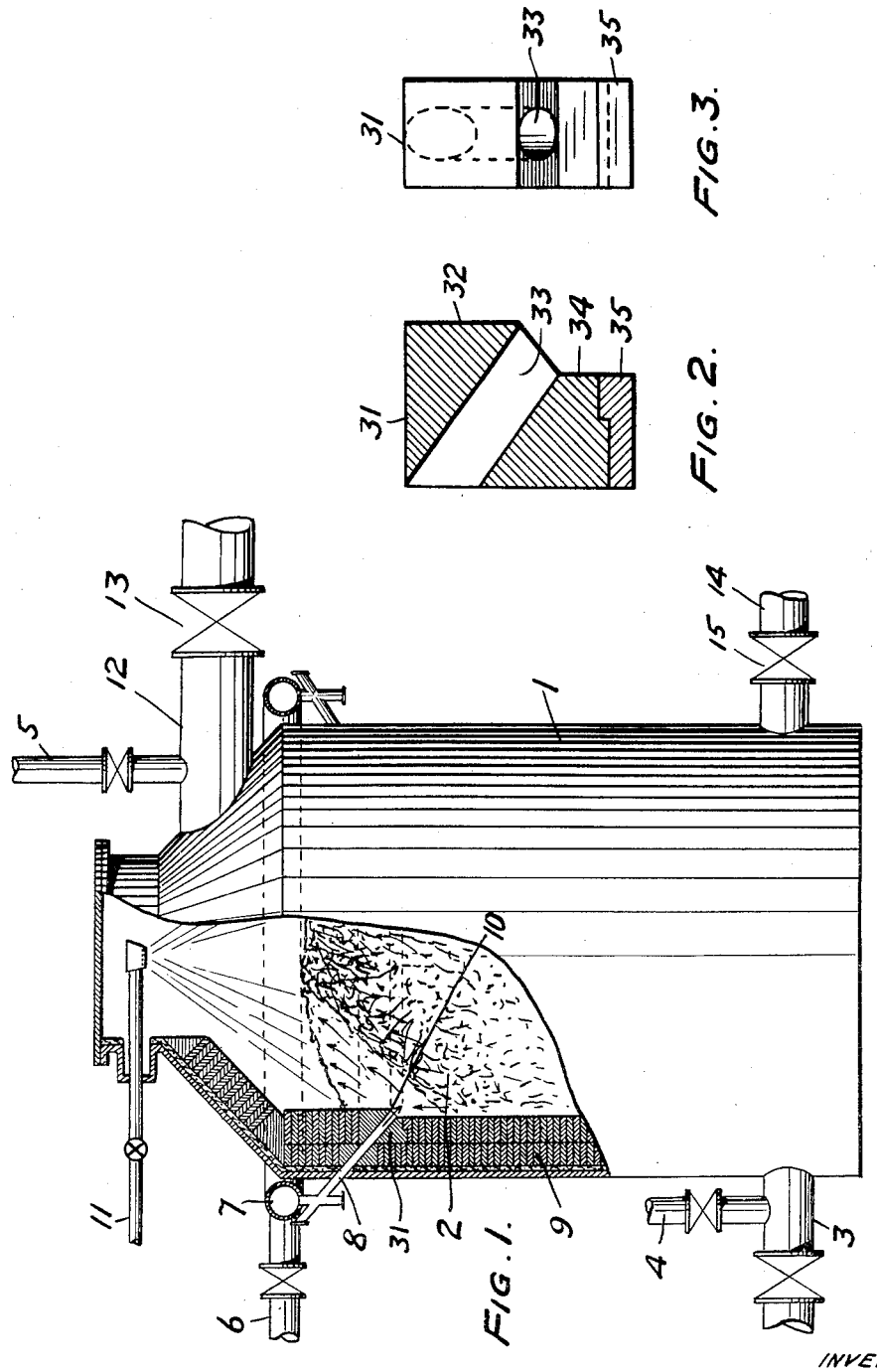
WITNESS:
INVENTOR
Edwin L. Hall
BY
Augustus B. Stoughton
ATTORNEY.

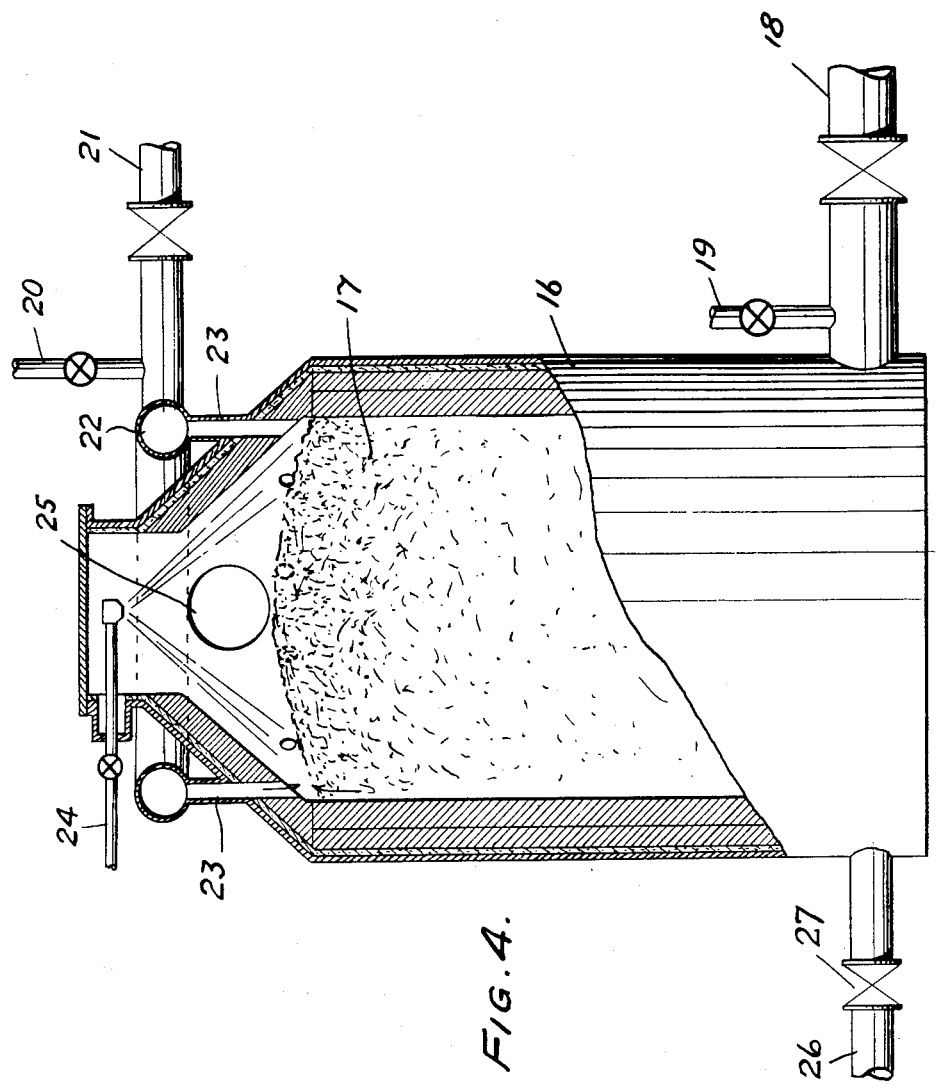

Patented Dec. 12, 1933

1,939,393

UNITED STATES PATENT OFFICE 1,939,393

PROCESS OF THE MANUFACTURE OF CARBURETED WATER GAS

Edwin L. Hall, Philadelphia, Pa., assignor to The United Gas Improvement Company, Philadelphia, Pa., a corporation of Pennsylvania Application March 5, 1931. Serial No. 520,232

2 Claims. (Cl. 48—205)

The present invention relates to the manufacture of carbureted water gas.

In U. S. Patent 1,493,458, issued May 6, 1924, to Evans, Perry and Eichengreen there is described a method of manufacturing carbureted water gas according to which, during the air blasting period, the producer gas generated by the primary air blast is burned by secondary air adjacent the top of the fuel bed to heat a ring at the fuel bed top onto which heavy oil is sprayed and vaporized during the runs.

The principal object of the present invention is to improve the introduction of the secondary air adjacent the top of the fuel bed and whether above or between the same.

In the operation of a water gas generator the capacity of the generator is limited by the air blast rate which can be employed without blowing too much fuel out of the generator from the top of the fuel bed. The quantity of such blown over fuel depends among other factors, upon the velocity of the gases passing through and across the top of the fuel bed.

The admission of secondary air to the top of the generator increases the quantity of gases passing through the top of the generator and the gas velocity. If the secondary air is introduced below the fuel bed top, both the gas velocity through the top of the fuel bed and that across it are increased. If the secondary air is introduced above the top of the fuel bed, the gas velocity across the fuel bed top is increased.

According to the present invention the tendency for fuel to be blown out of the generator due to a high air blast rate is eliminated or reduced by introducing the secondary air downwardly.

The invention will be more particularly described and the above and other features of the invention pointed out in connection with the attached figures which form a part of this specification and in which—

Figure 1 shows in partial elevation and partial vertical cross section a water gas generator with secondary air admitted below the top of the fuel bed.

Figure 2 shows a vertical cross section of refractory shapes for the admission of secondary air as shown in Figure 1.

Figure 3 shows an end elevation of the refractory shapes of Figure 2.

Figure 4 shows in partial elevation and partion vertical cross section a water gas generator with secondary air admitted above the fuel bed top.

Referring to Figure 1, 1 generally indicates the generator provided with the ignited fuel bed 2. 3 is the primary air supply means for air blasting, 4 a steam supply means for uprunning. 5 is a steam supply means for down running. 6 generally indicates the secondary air supply means, including the bustle pipe 7, and a plurality of downwardly inclined conduits 8, which pass through the generator lining generally indicated as 9, terminating at an offset in the generator lining indicated at 10.

11 is an oil supply means for spraying oil onto the heated ring at the top of the fuel bed. 12 is a gas offtake above the fuel bed provided with valve 13. 14 is a gas offtake below the fuel bed provided with valve 15.

As an illustration of operation of the apparatus of Figure 1, the following is given—

The fuel bed is blasted with air supplied through 3, to store heat in the fuel bed for subsequent water gas runs. The producer gas generated by the primary air blast at 3, is burned with secondary air supplied through 6, 7 and 8, heating a marginal ring at the fuel bed top. The downward entrance of the secondary air meeting the upwardly rising producer gas forces the air producer gas and resultant products further toward the center of the generator than is the case with the horizontal secondary air inlets hitherto employed. As a result the gases emerge from the top of the fuel bed over a wider area than was hitherto the case and with a decreased velocity, due to the greater area of the channels through which the gases pass. The decreased velocity decreases the tendency to lift the fuel from the top of the fuel bed with high blast rates.

The blast products leave the generator through the offtake 12. During the operation valve 13 is opened and valve 15 closed.

After the air blast an uprun may be made with steam supplied at 4. The resultant water gas is carbureted with oil sprayed through 11, onto the heated ring of fuel at the top of the fuel bed, and vaporized by the heat stored there by the secondary combustion during the air blasting. The increased width of the heated ring over that produced by a horizontal secondary air inlet, increases the hot surfaces at the top of the fuel bed available for oil vaporization and permits an increase in the quantity of oil employed or with the same quantity of oil increases the completeness of the vaporization and reduces the concentration of the oil residues which tend to stop up the interstices in the fuel bed top.

After the uprun a downrun of steam may be made with steam introduced at 5 the resultant water gas passing out through 14. During this operation valve 13 is closed and valve 15 open. A short uncarbureted uprun may then be made and the cycle repeated.

The downwardly inclined secondary air inlet, besides the advantages before mentioned, also has less tendency to be stopped by fuel than a horizontal inlet.

Referring to Figures 2 and 3.

These figures show forms of refractory shapes that may be employed in the inner lining to provide the downward secondary air inlet. 31 generally indicates a fire brick shape which is arranged in the lining with the face 32 as a portion of the generator inner wall. It has formed in it the downwardly inclined channel 33 for conveying the secondary air and is provided with the lower face 34 providing an offset in the generator wall at the inner end of the channel 33. At its base the shape 1 interlocks with the key shape 35.

Referring to Figure 4.

This figure shows a modification of the apparatus of the invention in which the secondary air is admitted to the generator above the top of the fuel bed.

16 generally indicates the generator provided with the ignited fuel bed 17. 18 is the primary air blast supply means. 19 is the steam supply means for uprunning. 20 is a steam supply means for downrunning.

21 generally indicates the secondary air supply means provided with bustle pipe 22 and a plurality of inlet conduits 23 leading downwardly into the top of the generator.

24 is an oil supply means arranged to spray oil onto the top of the fuel bed heated by secondary combustion. 25 is a gas offtake above the fuel bed provided with a valve (not shown). 26 is a gas offtake below the fuel bed provided with valve 27.

As an illustration of the operation of the apparatus of Figure 4 the following is given—

The fuel bed is blasted with air supplied at 26 to store heat in the fuel bed for water gas making. During this air blast, secondary air is admitted through 21, 22 and 23 and the producer gas generated by the primary air blast is burned in the top of the generator heating the fuel bed top. The downward entrance of the secondary air above the fuel bed opposes the tendency of the producer gas emerging from the fuel bed to lift the fuel off the top of the fuel bed and the tendency for fuel to be blown out of the generator is decreased as compared with the employment of a horizontal inlet. The downward entrance of the air also tends to carry the air into contact with previously deposited oil residues and assists in their consumption to maintain an open fuel bed for the passage of gas. During the air blast, offtake 25 is open and valve 27 in offtake 26 closed.

After the air blast an uprun may be made with steam supplied through 19. The resultant water gas is carbureted by oil sprayed through 24 onto the highly heated portions of the fuel bed top. The gas and oil vapors pass out of the generator through offtake 25.

After the uprun a downrun may be made with offtake 25 shut off and valve 27 in offtake 26 open. Steam is admitted through 20, the resultant water gas passing out through 26.

After a short uncarbureted uprun the cycle may be repeated.

The arrangement shown in Figure 4 is particularly advantageous in its employment with a cone top generator. The bustle pipe may be arranged as shown above the cone and within the projection of the walls of the main portion of the generator, saving space and enabling the installation of the apparatus on existing water gas sets where little space is available.

It will be obvious to those skilled in the art that the generators illustrated may be employed in conjunction with other vessels of a carbureted water gas set, such as the carbureter, superheater and washbox which have been omitted for the sake of simplicity. In such employment, superheated steam may be used for downrunning.

It will also be obvious that operating the generator of Figure 1 with a lower fire than illustrated will cause the introduction of secondary air at or above the top of the fuel bed.

While particularly adapted to the use of heavy oils and residuums such as "bunker oil", the apparatus of the invention will be of advantage in the use of gas oil if it is desired to vaporize such oil on the fuel bed.

These and other modifications of the apparatus illustrated may be made without departing from the spirit of this invention.

I do not intend to be limited in the practice of my invention save as the scope of the prior art and of the attached claims may require.

I claim:

1. A process for the manufacture of carbureted water gas which process includes the following steps; air blasting an ignited column of solid fuel resting on a grate thereby making producer gas, simultaneously introducing secondary air to the producer gas adjacent the top of the fuel bed and in generally downward direction and at such velocity as to reduce the quantity of fuel blown off at the top of the fuel bed, storing heat in the upper portion of the fuel bed by burning the producer gas with the secondary air; making a steam run through the fuel bed producing blue water gas and simultaneously depositing oil on the top of the fuel bed, and carbureting the blue water gas with oil vaporized by the heat stored in the upper part of the fuel bed.

2. A process for the manufacture of carbureted water gas which process includes the following steps; upwardly air blasting an ignited column of solid fuel resting on a grate thereby making producer gas, simultaneously passing secondary air downwardly into contact with the producer gas and at such a velocity as substantially to avoid agitating the fuel bed, and storing heat at the top of the fuel bed by burning the producer gas with the secondary air; and making an uprun with steam through the fuel bed producing blue water gas, and carbureting the blue water gas with oil introduced onto the top of the fuel bed and vaporized by the heat stored therein.

EDWIN L. HALL.